United States Patent [19]
Ritterman

[11] 4,142,025
[45] Feb. 27, 1979

[54] SEALED NICKEL CADMIUM BATTERY CAPABLE OF WITHSTANDING HIGH RATE OVERDISCHARGE

[75] Inventor: Paul F. Ritterman, Granada Hills, Calif.

[73] Assignee: TRW Inc., Redondo Beach, Calif.

[21] Appl. No.: 724,188

[22] Filed: Sep. 17, 1976

[51] Int. Cl.² ............................................ H01M 10/34
[52] U.S. Cl. .................................... 429/60; 429/222; 429/223
[58] Field of Search ................................. 429/57-60, 429/50, 222, 223, 219

[56] References Cited
U.S. PATENT DOCUMENTS

| | | | |
|---|---|---|---|
| 2,994,730 | 8/1961 | Freas | 429/57 |
| 3,410,726 | 11/1968 | Harivel | 429/59 |
| 3,438,812 | 4/1969 | Cherney et al. | 429/59 |
| 3,483,259 | 12/1969 | Seiger et al. | 429/222 X |
| 3,877,985 | 4/1975 | Rampel | 429/59 |
| 3,888,695 | 6/1975 | Catherino | 429/222 |

*Primary Examiner*—Charles F. LeFevour
*Attorney, Agent, or Firm*—Donald R. Nyhagen; John J. Connors

[57] ABSTRACT

Excessive hydrogen pressure buildup in a sealed nickel cadmium cell during overdischarge of the cell is avoided by adsorption of the evolved hydrogen on an exposed catalyst (c) embodied in the negative cadmium electrode and combination of the adsorbed hydrogen and the active medium of the negative electrode according to the reactions $$H_2 + (c) \rightarrow 2H(c)$$

$$2H(c) + Cd(OH)_2 \rightarrow 2H_2O + Cd$$

4 Claims, 5 Drawing Figures

SEALED NICKEL CADMIUM BATTERY CAPABLE OF WITHSTANDING HIGH RATE OVERDISCHARGE

BACKGROUND OF THE INVENTION

1. Field of the Invention

This invention relates generally to electrical storage batteries and more particularly to an improved sealed nickel cadmium battery cell which is immune to excessive hydrogen pressure buildup during overdischarge of the cell.

2. Prior Art

Nickel cadmium batteries are widely used for a variety of electrical power storage applications, notably electrical power storage in spacecraft. The basic arrangement, construction, and chemistry of such batteries are well known and hence need not be elaborated on in this disclosure.

Suffice it to say that sealed nickel cadmium batteries of the kind used for spacecraft energy storage, while having many desirable features and advantages for this type of service, have an outstanding disadvantage or deficiency which detracts from their usefulness, particularly for orbiting satellite applications. The deficiency referred to resides in the fact that in the absence of any preventative or corrective measures, it is possible for some battery cells to be forced into a voltage reversal or overdischarge condition during orbital cycling of the batteries due to cell imbalance. This condition, if it occurs, results in hydrogen evolution at the positive battery electrodes which, if not compensated for, will result in an excessive pressure buildup in the sealed batteries and eventual catastrophic failure of the batteries if not the entire satellite.

At the present time, this problem is alleviated by the use of protective bypass electronics for each cell which operates to bypass current around the cell if and when cell voltage reversal occurs. This type of protective system, while perhaps satisfactory from the standpoint of cell and battery protection, is costly, adds substantial weight to the battery package, and hence is not totally satisfactory.

SUMMARY OF THE INVENTION

The present invention seeks to avoid the problem of excessive cell pressure in a nickel cadmium battery during cell voltage reversal or overdischarge without the necessity of a complex, costly, and relatively massive protective system such as the cell bypass system referred to earlier. This is accomplished by constructing a nickel cadmium battery cell in such a way that hydrogen evolved at the positive cell electrode during overdischarge combines with the active material of the negative cadmium electrode to produce cadmium and water.

To this end, the negative cell electrode is provided with an exposed catalyst (c) which adsorbs hydrogen evolved at the positive cell electrode and effects or catalyzes recombination of the hydrogen and the active material, $Cd(OH)_2$, of the negative cadmium electrode according to the following equations

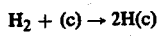

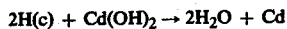

The catalyst (c) is selected from the group comprising nickel, silver, platinum, carbon, lattice defect bronze. The interelectrode distance between the positive and negative electrodes is preferably somewhat smaller than that of a standard nickel, on the order of 5 to 6 mil compared to 8 to 9 mil for conventional cell. A negative cell electrode according to the invention may have an array of exposed catalyst surface regions distributed over the electrode surface area.

DESCRIPTION OF THE PREFERRED EMBODIMENTS

Figure 1:
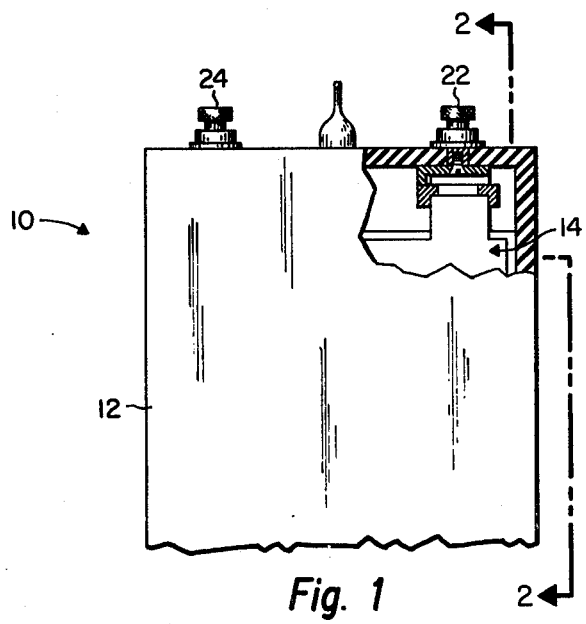
FIG. 1 is a side elevation, partly in section, of a sealed nickel cadmium battery cell according to the invention.
Figure 2:
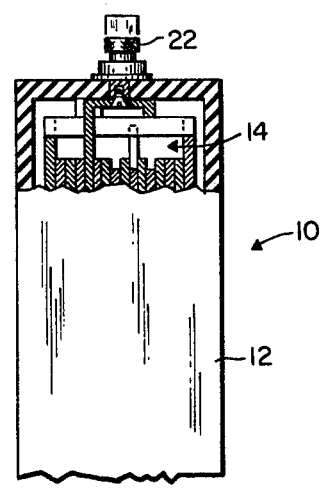
FIG. 2 is a section taken on line 2—2 in FIG. 1.
Figure 3:
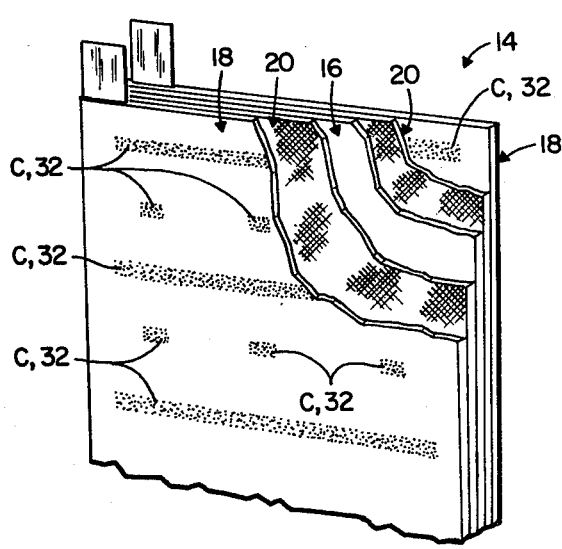
FIG. 3 is a perspective view, partly broken away, of a portion of one nickel-cadmium electrode stack of the cell.

Referring first to FIGS. 1 and 2 of the drawings, the illustrated nickel cadmium battery cell 10 is essentially conventional except for its negative electrode construction and its interelectrode spacing described below and is otherwise similar to the cell described in many United States patents. Accordingly, it is unnecessary to describe the basic cell construction in elaborate detail.

Suffice it to say that the cell 10 has a hermetically sealed casing 12 constructed of steel or other suitable material. Contained within the casing is an electrode stack 14. This electrode stack includes positive and negative electrodes 16, 18 and separators 20 between the adjacent positive and negative electrodes. The positive electrodes 16 are conventional.

The separators 20 are also conventional and comprise mats of a suitable dielectric material, such as polypropylene, which is porous to the cell electrolyte. As indicated earlier, the negative cell electrodes 18 constitute the major contribution of this invention and are uniquely constructed in the manner to be described presently to avoid excessive hydrogen gas pressure buildup in the cell during overdischarge of the cell. Cell electrodes 16, 18 are electrically connected to the positive and negative cell terminals 22, 24 in the usual way.

Before proceeding with a detailed description of the negative electrodes 18, it is well to consider the basic chemistry of the nickel cadmium battery cell. Again, this chemistry, like the basic construction of cell 10, is conventional and well known and hence need not be described in elaborate detail. Suffice it to say that a nickel cadmium battery, when positive limiting on discharge, behaves according to the following equations after exhaustion of all positive capacity.

At the positive electrode:

$$2H_2O + 2e^- \rightarrow 2OH^- + H_2 \tag{1}$$

At the negative electrode:

$$Cd + 2OH^- \rightarrow Cd(OH)_2 + 2e \tag{2}$$

The total cell reaction:

$$Cd + 2H_2O \rightarrow Cd(OH)_2 + H_2 \qquad (3)$$

As noted earlier and as is well known to those versed in the art, this hydrogen gas evolution at the positive electrode of a sealed nickel cadmium cell during overdischarge will eventually result in excessive pressure buildup in the cell, catastrophic failure of the cell and the battery containing the cell, and, in the case of a spacecraft, catastrophic failure of the spacecraft power system.

This invention seeks to avoid this over pressure problem by effecting recombination of the hydrogen evolved at the positive electrode with the active material of the negative electrode 18 in a manner such that the products of the reaction are metallic cadmium and water. To this end, the invention provides a negative electrode including both the active negative electrode material 26 which is cadmium and cadmium hydroxide and an exposed catalyst (c) which adsorbs the evolved hydrogen and effects recombination of the same with the active electrode material according to the following equations:

$$H_2 + (c) \rightarrow 2H(c) \qquad (4)$$

$$2H(c) + Cd(OH)_2 \rightarrow Cd + 2H_2O \qquad (5)$$

The catalyst (c) is selected from the group comprising silver, nickel, platinum, carbon, and lattice defect bronze. It will be understood, of course, that the catalyst is exposed to adsorb the evolved hydrogen.

Figure 4:
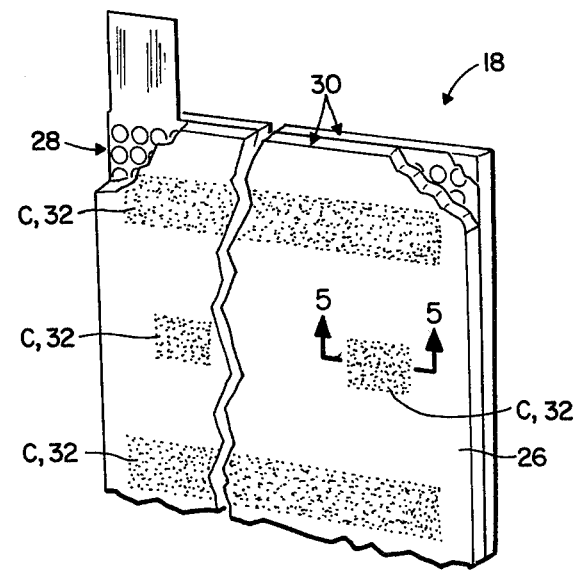
FIG. 4 is an enlarged perspective view of the negative cell electrode which constitutes a major contribution of this invention.
Figure 5:
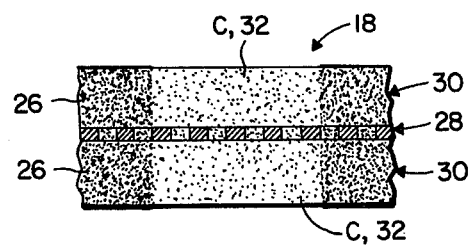
FIG. 5 is an enlarged section taken on line 5—5 in FIG. 4.

Referring particularly to FIGS. 4 and 5, the preferred negative electrode 18 shown has a perforated screen base or support 28 covered by a layer of sintered nickel 30 impregnated with cadmium and cadmium hydroxide which forms the active electrode material or surfaces 26. Distributed about these active surfaces are exposed surface regions 32 of the catalyst (c). In the particular electrode shown, the catalyst (c) is the nickel of the sintered nickel layer 30. The catlyst regions 32 may be provided by masking or covering these regions with a suitable maskant, such as teflon sheet material prior to impregnation of the sintered nickel with cadmium and then removing the maskant. Another maskant which may be used is an organic reagent such as ethyl acetate which, after impregnation of the sintered nickel with cadmium, can be dissolved with acetone.

During operation of the nickel cadmium cell 10, the catalyst surfaces 32 on the negative cell electrodes 18 adsorb the hydrogen evolved at the positive electrodes 16 in accordance with equations (1) and (3) and effect recombination of this hydrogen and the active material $Cd(OH)_2$ of the negative electrodes 18 in accordance with equations (4) and (5). In the case of the particular negative electrode shown, these equations become:

$$H_2 + (Ni) \rightarrow 2H(Ni) \qquad (6)$$

$$2H(Ni) + Cd(OH)_2 \rightarrow Cd + 2H_2O \qquad (7)$$

It is believed that this recombination action may be enhanced by maximizing the surface area of the sintered nickel 30 by using a multiple nickel particle size for the sintering process. The negative electrode should be impregnated using 28 percent or less KOH concentration (S.O.A. = 34%) and an impregnation technique which will leave a minimum amount of cadmium on the electrode surface, such as electrochemical impregnation or ion loading vacuum impregnation. The interelectrode spacing between each negative electrode 18 and its adjacent positive electrodes 16 it is believed should be on the order of 5 to 6 mil compared to a spacing of 8 to 9 mil for conventional cells. The negative capacity of the cell when fully charged should be between 130 and 140 percent of the positive capacity compared to 120 to 130 percent for standard cells.

As noted earlier, other catalysts (c) selected from the group comprising nickel, silver, platinum, carbon, and lattice defect bronze may be used in the present cell.

The total reaction (equation 7) at the negative electrode may be broken up into two equations (8) and (9) as follows, the sum of which is equivalent to (7).

$$2H(Ni) + 2OH^- \rightarrow 2H_2O + 2e^- \qquad (8)$$

$$Cd(OH) + 2e^- \rightarrow Cd + 2OH^- \qquad (9)$$

I claim:

1. In a nickel cadmium battery cell having a sealed casing containing positive and negative electrodes immersed in an electrolyte and characterized by high rate cell reversal capability due to enhanced hydrogen recombination at the negative electrodes, and wherein when the cell is in a state of positive limiting on discharge with all positive capacity exhausted, the total cell reaction occurs according to the equation $$Cd + 2H_2O \rightarrow Cd(OH)_2 + H_2$$

the improvements wherein each negative electrode comprises:

a support;

a sintered catalyst layer covering said support;

cadmium material on said support providing an exposed active electrode surface contacting said electrolyte;

said cadmium material saturating portions only of said catalyst layer in such a way as to provide cadmium-free regions of said catalyst layer having exposed catalyst surfaces of substantial area contacting said electrolyte; and the catalyst of said catalyst layer being selected from the group consisting of nickel, silver, carbon, platinum, and lattice defect bronze and being exposed to said electrolyte, whereby hydrogen evolved in said cell state combines with the cadmium of the negative electrode according to the reaction $$H_2 + (c) \rightarrow 2H(c)$$

$$2H(c) + Cd(OH)_2 \rightarrow Cd + 2H_2O$$

where (c) represents said catalyst.

2. In a nickel cadmium battery cell having a sealed casing containing positive and negative electrodes immersed in an electrolyte and characterized by high rate cell reversal capability due to enhanced hydrogen recombination at the negative electrodes, and wherein when the cell is in a state of positive limiting on discharge with all positive capacity exhausted, the total cell reaction occurs according to the equation $$Cd + 2H_2O \rightarrow Cd(OH)_2 + H_2$$

the improvements wherein each negative electrode comprises:

a perforated screen support;

a sintered nickel layer covering said support;

cadmium material on said support providing an exposed active electrode surface contacting said electrolyte;

said cadmium material saturating portions only of said sintered nickel layer in such a way as to provide cadmium-free regions of sintered nickel having exposed sintered nickel surfaces of substantial area contacting said electrolyte, whereby hydrogen evolved in said cell state combines with the cadmium of the negative electrode according to the reaction $$H_2 + (Ni) \rightarrow 2H(Ni)$$

$$2H(Ni) + Cd(OH)_2 \rightarrow Cd + 2H_2O.$$

3. A negative electrode for a nickel cadmium battery cell having a sealed casing containing positive and negative electrodes immersed in an electrolyte and characterized by high rate cell reversal capability due to enhanced hydrogen recombination at the negative electrodes, and wherein when the cell is in a state of positive limiting on discharge with all positive capacity exhausted, the total cell reaction occurs according to the equation $$Cd + 2H_2O \rightarrow Cd(OH)_2 + H_2$$

said negative electrode comprising:
a support;
a sintered catalyst layer covering said support;
cadmium material on said support providing an exposed active electrode surface for contacting said electrolyte;
said cadmium material saturating portions only of said catalyst layer in such a way as to provide cadmium-free regions of said catalyst layer having exposed catalyst surfaces of substantial area for contacting said electrolyte; and
the catalyst of said catalyst layer being selected from the group consisting of nickel, silver, carbon, platinum, and lattice defect bronze and exposed to said electrolyte, whereby hydrogen evolved in said cell state combines with the cadmium of the negative electrode according to the reaction $$H_2 + (c) \rightarrow 2H(c)$$

$$2H(c) + Cd(OH)_2 \rightarrow Cd + 2H_2O$$

where (c) represents said catalyst.

4. A negative electrode for a nickel cadmium battery cell having a sealed casing containing positive and negative electrodes immersed in an electrolyte and characterized by high rate cell reversal capability due to enhanced hydrogen recombination at the negative electrodes, and wherein when the cell is in a state of positive limiting on discharge with all positive capacity exhausted, the total cell reaction occurs according to the equation $$Cd + 2H_2O \rightarrow Cd(OH)_2 + H_2$$

said negative electrode comprising:
a perforated screen support;
a sintered nickel layer covering said support;
cadmium material on said support providing an exposed active electrode surface for contacting said electrolyte; and
said cadmium material saturating portions only of said sintered nickel layer in such a way as to provide cadmium-free regions of sintered nickel having exposed sintered nickel surfaces of substantial area for contacting said electrolyte, whereby hydrogen evolved in said cell state combines with the cadmium of the negative electrode according to the reaction $$H_2 + (Ni) \rightarrow 2H(Ni)$$

$$2H(Ni) + Cd(OH)_2 \rightarrow Cd + 2H_2O.$$

* * * * *